United States Patent
Giltner et al.

(10) Patent No.: US 11,797,726 B2
(45) Date of Patent: Oct. 24, 2023

(54) SYSTEMS FOR AUTOMATED BLAST DESIGN PLANNING AND METHODS RELATED THERETO

(71) Applicant: Dyno Nobel, Inc., Salt Lake City, UT (US)

(72) Inventors: Scott Giltner, Louisville, KY (US); Rufus E. Flinchum, Roanoke, VA (US); Jeffrey Averett, Grantsville, UT (US); Joseph Nawrocki, Jr., Buena Vista, VA (US)

(73) Assignee: Dyno Nobel Inc., Salt Lake City, UT (US)

( * ) Notice: Subject to any disclaimer, the term of this patent is extended or adjusted under 35 U.S.C. 154(b) by 0 days.

(21) Appl. No.: 17/819,213

(22) Filed: Aug. 11, 2022

(65) Prior Publication Data

US 2023/0089887 A1  Mar. 23, 2023

Related U.S. Application Data

(63) Continuation of application No. 16/782,941, filed on Feb. 5, 2020, now Pat. No. 11,416,645, which is a
(Continued)

(51) Int. Cl.
*F42D 3/04* (2006.01)
*G06F 30/13* (2020.01)
(Continued)

(52) U.S. Cl.
CPC ............. *G06F 30/13* (2020.01); *F42D 3/04* (2013.01); *G06G 7/54* (2013.01); *G06Q 50/02* (2013.01); *G06F 2101/10* (2013.01)

(58) Field of Classification Search
CPC ..... F42D 3/04; F42D 1/00; F42D 1/08; E21B 44/00; E21D 9/006; A63F 13/211; A63F 13/216; A63F 13/837; A63F 13/25; A63F 2300/8076; G06F 30/13; G06F 2101/10; G06G 7/54; G06Q 50/02
(Continued)

(56) References Cited

U.S. PATENT DOCUMENTS 3,735,704 A  5/1973  Livingston
6,772,105 B1  8/2004  Heck
(Continued)

FOREIGN PATENT DOCUMENTS

KR  1020170019523  2/2017

OTHER PUBLICATIONS

International Search Report and Written Opinion dated Jun. 4, 2020 for PCT/US2020/016544.
O-Pit; https://www.o-pitblast.com; accessed Mar. 5, 2020.
Orica Blast IQ; https://www.oricaminingservies.com/au.en/section/products_and_services/blastiq_systems; accessed Mar. 5, 2020.
Strayos; https://www.strayos.com; accessed Mar. 5, 2020.
(Continued)

*Primary Examiner* — Michael D David
(74) *Attorney, Agent, or Firm* — Dorsey & Whitney LLP

(57) ABSTRACT

A system, method, or apparatus for generating a blast plan that can receive blast data comprising geological properties of a blast site, blasthole parameters, and available explosive product. A pattern footage can be determined based on a relationship between the face height, the specific energy of the available explosive product, and the geological properties of the bench. The burden and spacing can be determined from the pattern footage.

20 Claims, 15 Drawing Sheets

Related U.S. Application Data continuation of application No. PCT/US2020/016544, filed on Feb. 4, 2020.

(60) Provisional application No. 62/801,312, filed on Feb. 5, 2019.

(51) Int. Cl.
  G06G 7/54 (2006.01)
  G06Q 50/02 (2012.01)

(58) Field of Classification Search
  USPC ........ 102/312, 301, 302, 313; 175/2, 24, 57; 702/11
  See application file for complete search history.

(56) References Cited

U.S. PATENT DOCUMENTS

| | | | |
|---|---|---|---|
| 8,214,073 | B2 | 7/2012 | Keskinen |
| 8,392,014 | B2 | 3/2013 | Saeleniemi et al. |
| 8,538,698 | B2 | 9/2013 | Heck |
| 8,733,473 | B2 * | 5/2014 | Nadeau .................. E21B 44/00 700/173 |
| 9,476,303 | B2 | 10/2016 | Nettleton et al. |
| 9,605,926 | B1 | 3/2017 | Means et al. |
| 10,837,750 | B2 | 11/2020 | Averett et al. |
| 11,073,000 | B2 | 7/2021 | Oppolzer |
| 2012/0024605 | A1 | 2/2012 | Elinas et al. |
| 2012/0179322 | A1 | 7/2012 | Hennessy et al. |
| 2016/0313107 | A1 | 10/2016 | Birkin et al. |
| 2019/0234722 | A1 | 8/2019 | Averett et al. |
| 2020/0250355 | A1 * | 8/2020 | Giltner .................. G06Q 50/02 |
| 2021/0049344 | A1 | 2/2021 | Treat et al. |
| 2021/0148689 | A1 | 5/2021 | Averett et al. |

OTHER PUBLICATIONS

"Blast Design", Orica.com viewed Jun. 3, 2022 at https"//www.orica.com/products-services/mining-services/BlastIQ/solutions/blast-design#.YitXznrMKUk, May 2018.

"Blaster Guide a Resource for the Explosives and Blasting Industry: 2002", Viewed Jun. 3, 2022 at https://www.austinpowder.com/wp-content/themes/austinpowder/regional/blasters-guide/downloads/1-general_information.pdf, 2002.

"Blasting and Explosives—1 Quick Reference Guide", Viewed Jun. 3, 2022 at htttmp://www.leg.mn.gov/docs/2015/other/150681/PFEISret_1/Dyno%20Nobel%202010.pdf, 2010.

"Demonstrating Complete Blast Quality Control with the Next Generation BlastIQ Platform", Viewed Jun. 3, 2022 at https://www.youtube.com/watch?v=B2F_ND_9ptg, Jul. 31, 2018.

"ShotPlus", Orica.com viewed Jun. 3, 2022 at https://www.orica/product-services/mining-services/BlastIQ/technologies/shotplus#.YjTC7-pBw2x, 2019.

"Video Roundup 45th", ISEE, 2019 viewed Jun. 3, 2022 at https://www.youtube.com/watch?v=GZdkWPx3oDA, Jan. 28, 2019.

Bamford, Thomas, et al., "A Real-Time Analysis of Rock Fragmentation Using UAV Technology", 6th International Conference on Computer Applications in the Minerals Industries, Figure 6, Jul. 14, 2016, 1-12.

Hudson, et al., "Put to the Test—Case Studies, World Coas", http://pulications.workdcoal.com/flip/world-coal.2017/June/kplat4f.html, Jun. 2017.

Medinac, F., et al., "Pre-and Post-Blast rock Block Size Analysis Using UAV-Based Data and Discrete Fracture Network", 2nd International Discrete Fracture Network Engineering Conference, USA, tables 1-2 and Figures 5-6, Jun. 2018, 1-8.

India Office Action dated Feb. 17, 2023 for IN202117036511.

* cited by examiner

SYSTEMS FOR AUTOMATED BLAST DESIGN PLANNING AND METHODS RELATED THERETO

CROSS-REFERENCE TO RELATED APPLICATIONS

This application is a continuation of U.S. patent application Ser. No. 16/782,941, entitled "SYSTEMS FOR AUTOMATED BLAST DESIGN PLANNING AND METHODS RELATED THERETO," filed Feb. 5, 2020, which is a continuation of International Patent Application No. PCT/US2020/016544, entitled "SYSTEMS FOR AUTOMATED BLAST DESIGN PLANNING AND METHODS RELATED THERETO," filed Feb. 4, 2020, and claims the benefit of U.S. Provisional Patent Application No. 62/801,312, entitled "SYSTEMS FOR AUTOMATED BLAST DESIGN PLANNING AND METHODS RELATED THERETO," filed Feb. 5, 2019, each of which is hereby incorporated herein by reference in its entirety.

TECHNICAL FIELD

The present disclosure relates generally to explosives. More specifically, the present disclosure relates to methods, systems and apparatuses for designing a blast plan.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

DETAILED DESCRIPTION

Figure 1:
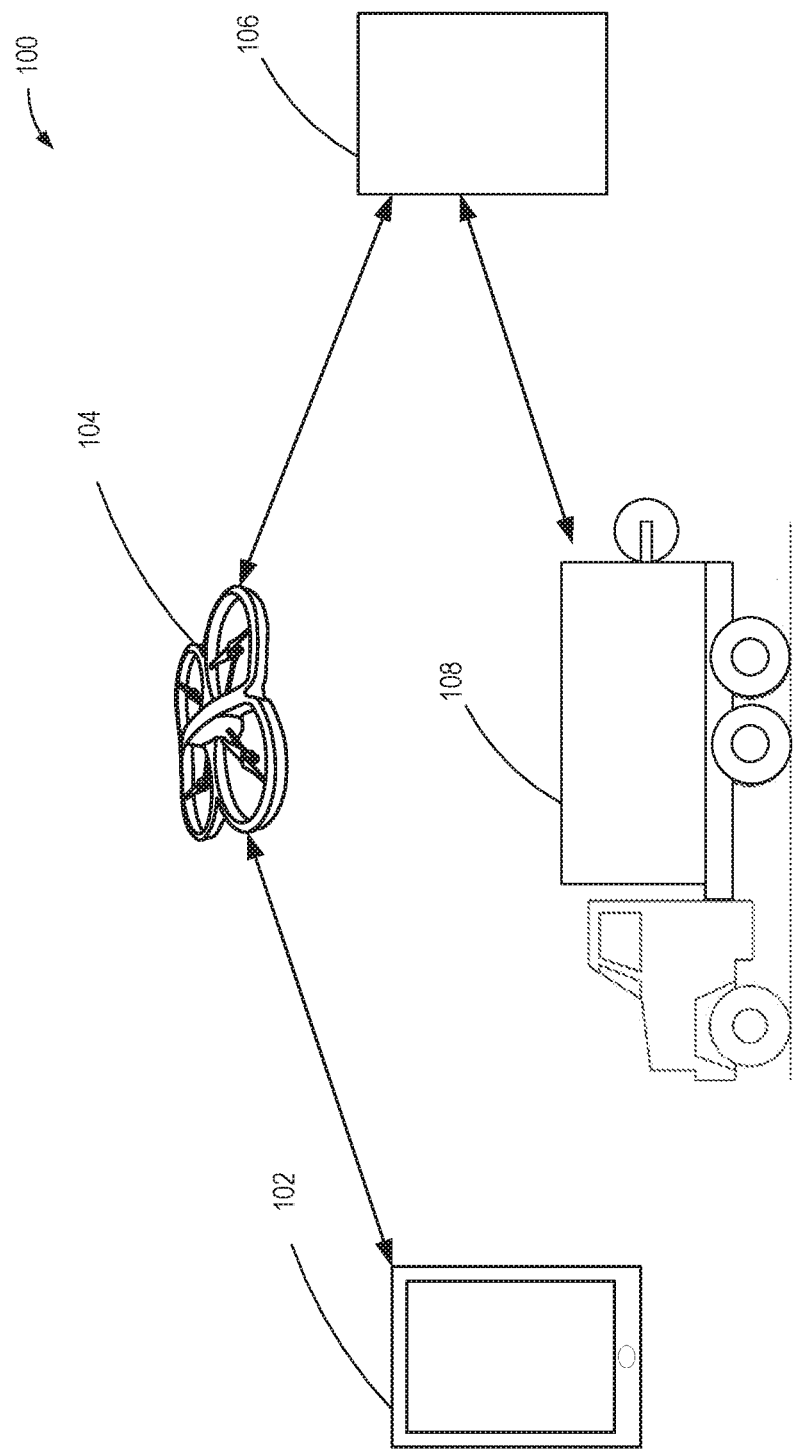
FIG. 1 illustrates a network diagram of a blast plan modeling system according to one embodiment.

Explosives are commonly used in the mining, quarrying, and excavation industries for breaking rocks and ore. Generally, a hole, referred to as a "blasthole," is drilled in a surface, such as the ground. Explosives may then be placed within the blasthole. Typically, multiple blastholes are used for breaking large amounts of rocks and ore. Using multiple blastholes introduces complexities for planning for a blast. For example, a blast may vary based on a plurality of factors including blasthole spacing, blasthole burden, blasthole depth, blasthole pattern, the number of blastholes, geological properties, the type of explosive, and the amount of explosive. The number of possibilities makes blast planning difficult, even for a highly trained blast engineer.

Described herein are embodiments for generating a blast plan. The embodiments may receive blast data comprising geological properties of a blast site, blasthole parameters, and available explosive product. Based on the received blast data, embodiments herein, may determine burden and spacing, and generate a blast plan.

A blast design or blast plan comprises the arrangement of blastholes, geometry of blastholes, and explosives to be used.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure, but is merely representative of various embodiments. While the various aspects of the embodiments are presented in the drawings, the drawings are not necessarily drawn to scale unless specifically indicated.

Embodiments and implementations of blast planning systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

FIG. 1 illustrates a network diagram of a blast plan modeling system 100, according to one embodiment. The blast plan modeling system 100 receives images of a blast site, generates a three-dimensional model of the blast site, and generates a blast plan. In the illustrated embodiment, the blast plan modeling system 100 comprises a personal electronic device (PED) 102, a drone 104, and a blast design system 106.

The PED 102 may be any number of different types of devices, including, but not limited to: portable telephone, a smart phone, a portable computing device, a tablet computer, a laptop computer, a notebook computer, a personal digital assistant (PDA), a palmtop computer, a handheld computer, a portable navigation device, a personal navigation assistant (e.g., portable Global Positioning System (GPS) unit), a drone controller, or the like. The PED 102 communicates with and controls the drone 104. The PED 102 may provide a flight plan and a perimeter of the blast site, and/or provide manual directions to the drone 104. In some embodiments, the PED 102 and the blast design system 106 may be the same device. In some embodiments, there may be no PED 102 and the blast design system 106 may control the drone 104.

The drone 104 may capture images as it follows a scanning path. The drone 104 may provide a live feed to the PED 102. The drone 104 may also provide images and associated location coordinates and altitude to the blast design system 106. In some embodiments, a camera, cell phone, or other electronic device may be used to capture the images.

The blast design system 106 may receive the images and generate a three-dimensional model. The blast design system 106 may also receive user defined parameters such as geological properties of a blast site, blasthole parameters, and available explosive product. Based on the user defined parameters, the blast design system 106 may determine a burden and spacing for a blast plan. The blast design system 106 can overlay the blast plan on the three-dimensional model and present the overlaid model to a technician. The technician may make alterations and a final blast plan may be sent out to site equipment 108 and operators of the site equipment 108 for implementation.

In some embodiments, the drone 104 or other image capturing device captures post-blast images. The blast design system 106 may perform post-blast analysis and use the results in a next blast plan. Such artificial intelligent feedback may cause successive blasts to be further optimized. The post-blast analysis may determine the size and location of debris from the blast.

Figure 2:
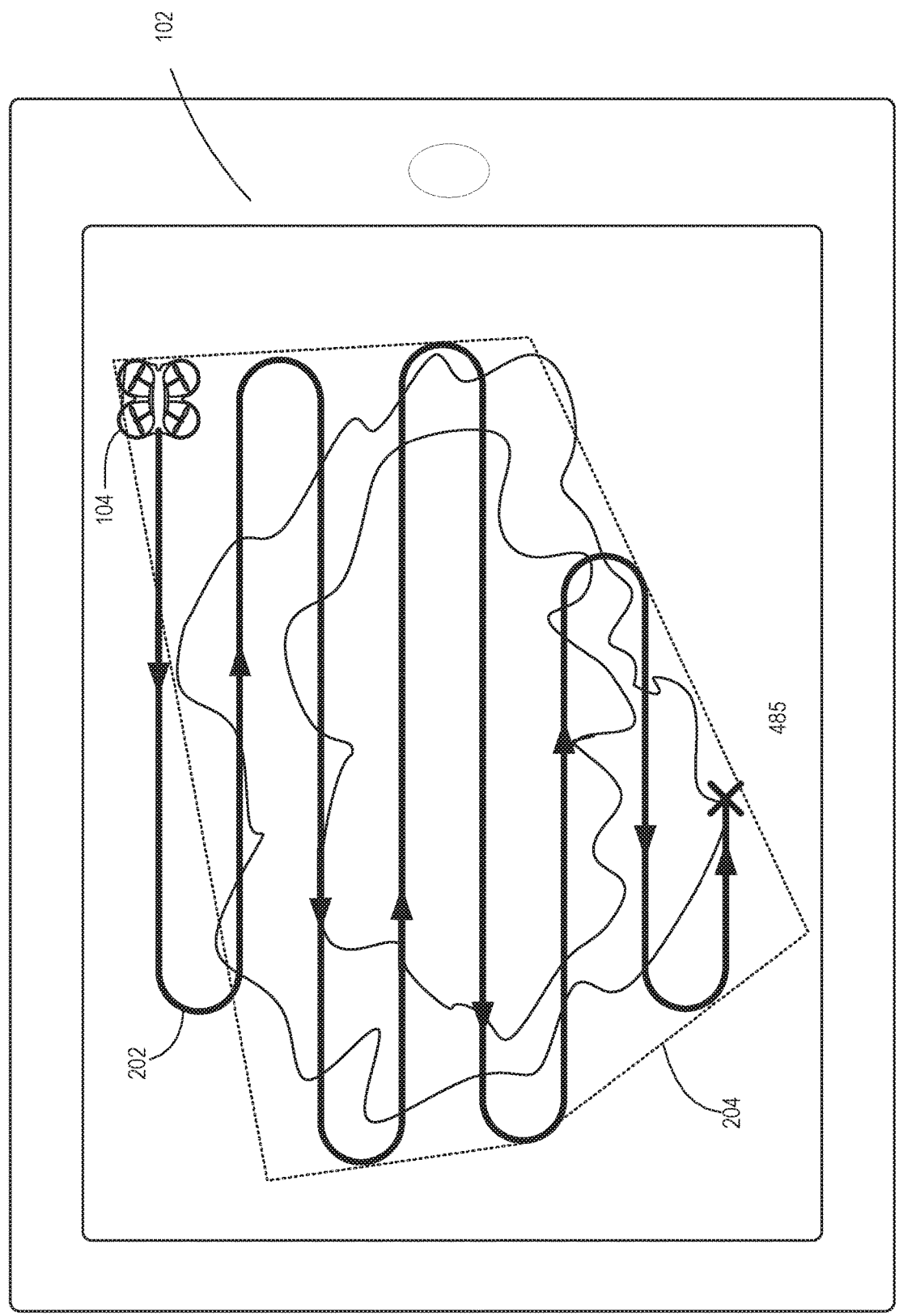
FIG. 2 illustrates a personal electronic device displaying a scanning path of a drone according to one embodiment.

FIG. 2 illustrates the PED 102 displaying a scanning path 202 of a drone 104, according to one embodiment. The scanning path 202 is designed to allow the drone to capture images within a perimeter 204 of the blast site. In some embodiments, a technician may manually enter the scanning path 202. The PED 102 may optimize a manually entered scanning path 202 or design the scanning path 202 based on the perimeter 204 of the blast site.

Figure 3:
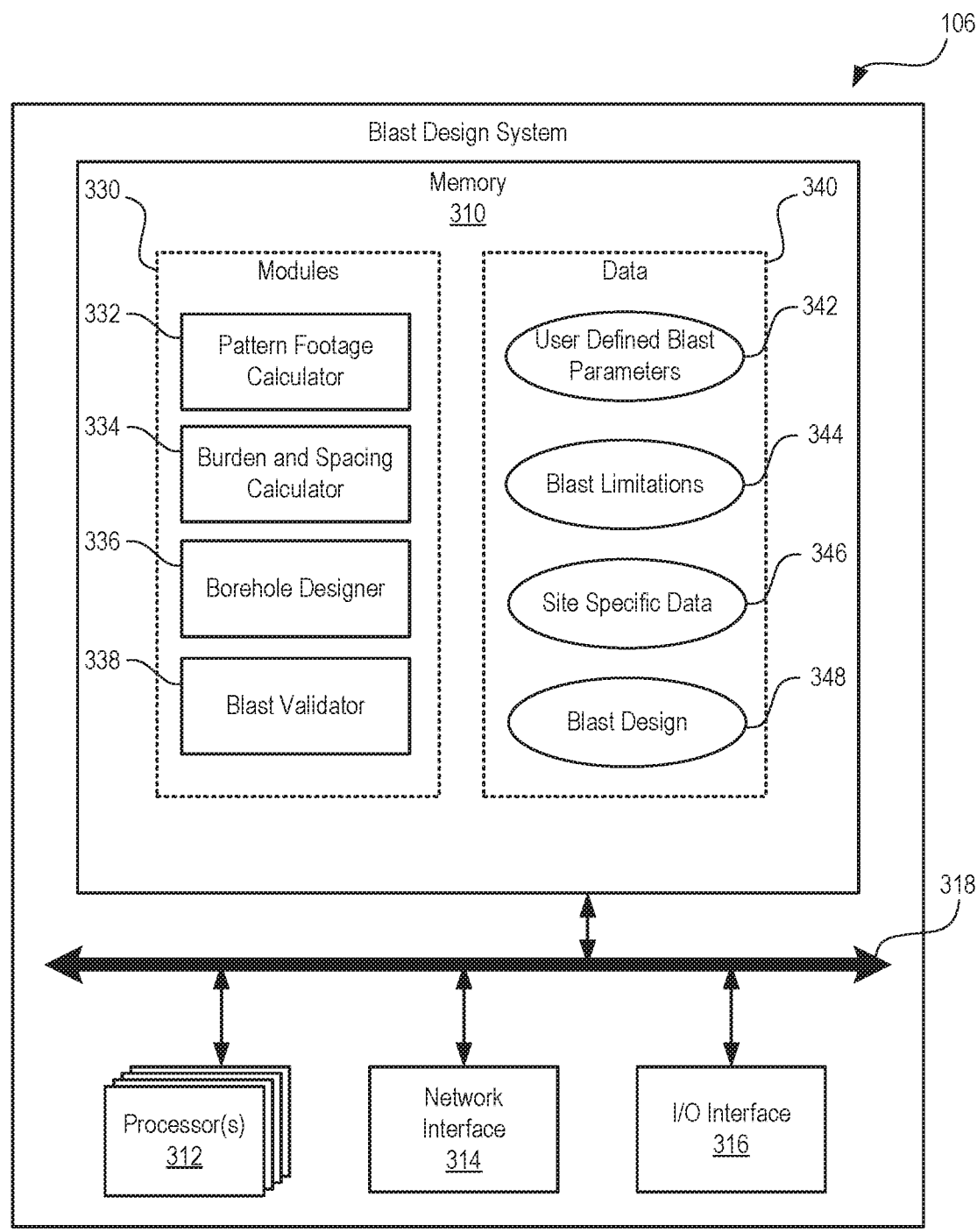
FIG. 3 illustrates a block diagram of a blast design system according to one embodiment.

FIG. 3 illustrates a block diagram of the blast design system 106 of FIG. 1, according to one embodiment. The blast design system 106 may include an electronic memory 310, one or more processors 312, a network interface 314, and an I/O interface 316 in electrical communication via a system bus 318.

The electronic memory 310 may include static RAM, dynamic RAM, flash memory, one or more flip-flops, or other electronic storage medium. The electronic memory 310 may include a plurality of modules 330 and data 340.

The modules 330 may include all or portions of other elements of the device. The modules 330 may run multiple operations serially, concurrently or in parallel by or on the one or more processors 312.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

The modules 330 may include a pattern footage calculator 332, a burden and spacing calculator 334, a borehole designer 336, and a blast validator 338. The pattern footage calculator 332 may, by the one or more processors 312, perform operations to determine a pattern footage defining an area around holes in a blast plan. The pattern footage represents an area capable of being properly fragmented by the available explosive product in a blasthole located in the bench. Determining the pattern footage may be based on a relationship between the face height, the specific energy of the available explosive product, and the geological properties of the bench. The burden and spacing calculator 334 may determine a burden and spacing for holes in the blast plan based on the pattern footage. The borehole designer 336 may determine borehole design details. The blast validator 338 may determine if the blast will meet certain criteria.

The data 340 stored on the electronic memory 310 may include received data and data generated by the blast design system 106, such as by the modules 330 or other modules. The data 340 stored may be organized as one or more memory registers/addresses, files, and/or databases.

The data 340 may include user defined blast parameters 342, blast limitations 344, site specific data 346, and a blast design 348. The user defined blast parameters 342 may include face height, pattern type (e.g., rectangular, staggered, square), and wet holes designation. The blast limitations 344 may include weight of explosives, weight of material to be blasted, volume of material to be blasted, and number of holes. Site specific data 346 may include available drill diameters, geological data, available explosive product, and seismographic information. The user defined blast parameters 342, blast limitations 344, and site specific data 346 may be entered by a user via the I/O interface 316 or received from another device through the network interface 314. The modules 330 may generate the blast design 348 based on the inputs. In some embodiments, the data 340 may include post-blast analysis that may be used by the modules 330 to output a more optimized blast design 348.

The one or more processors 312 may include any computing circuitry. The one or more processors 312 may include general purpose processors and/or special purpose processors. The network interface 314 may facilitate communication with other computing devices and/or networks, such as the Internet and/or other computing and/or communications networks. The network interface 314 may be equipped with conventional network connectivity. The network interface 314 may be a wireless network interface, equipped with conventional wireless network connectivity technologies. In some embodiments, the network interface 314 may be used to communicate with a current and voltage sensor measuring power consumption of the area in which the processing circuitry (not shown) is located. The I/O interface 316 may facilitate interfacing with one or more input devices and/or one or more output devices.

The system bus 318 may facilitate communication and/or interaction between the other components of the blast design system, including the electronic memory 310, the one or more processors 312, the network interface 314, and the I/O interface 316.

As can be appreciated, in other embodiments, the processing circuitry 350 may be simpler than shown or described. For example, certain designs may forgo one or more components, such as memory, multiple processors, multiple interfaces, and the like, and instead execute instructions closer to or on bare metal (e.g., without an intervening operating system or other software layer, executing instructions directly on logic hardware).

Figure 4:
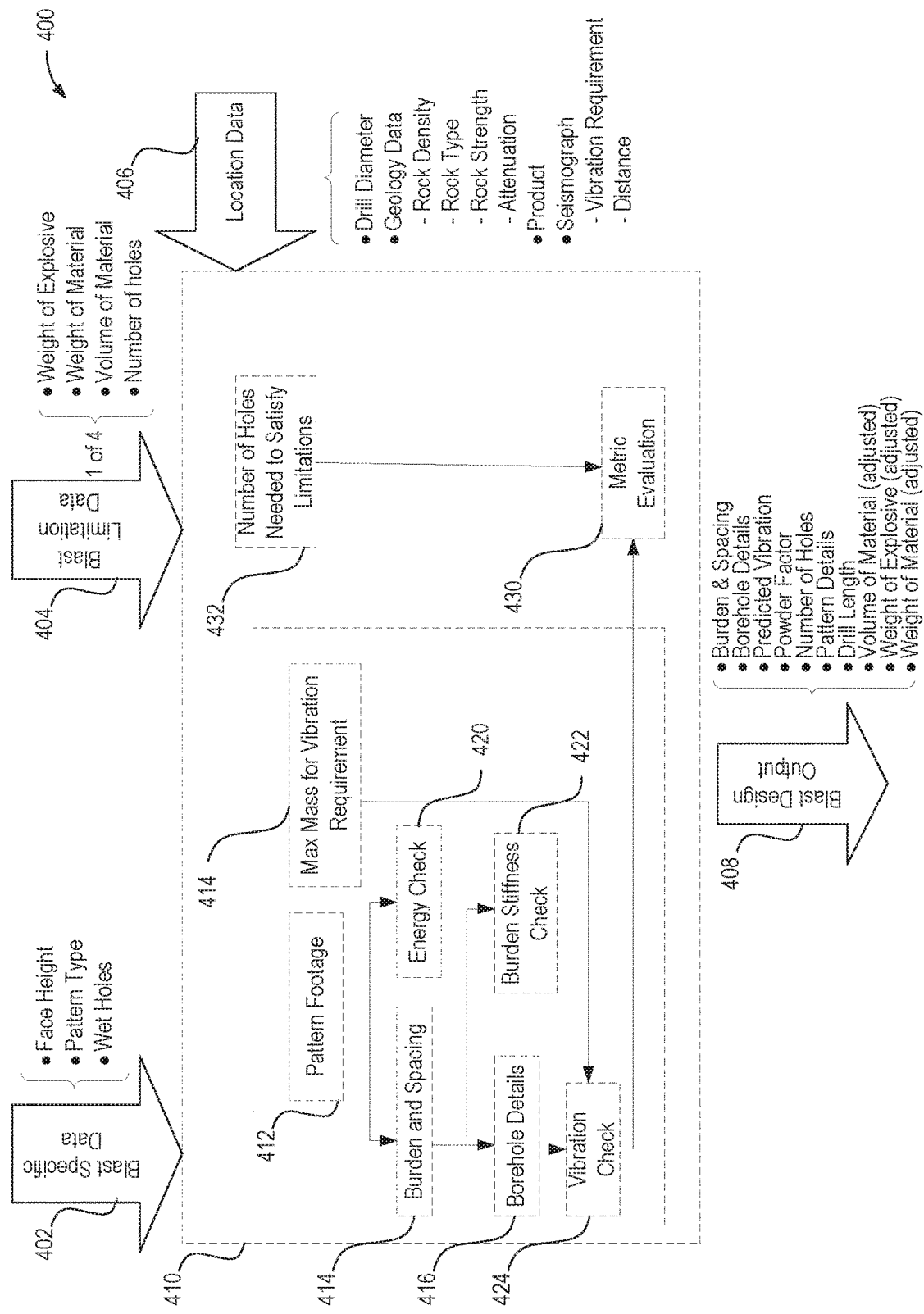
FIG. 4 illustrates a flow chart of a method for generating a blast design according to one embodiment.

FIG. 4 illustrates a flow chart of a method 400 for generating a blast design output 408 according to one embodiment. The method 400 may be used by the blast design system 106 of FIGS. 1 and 3 to generate a blast design 408. To perform the calculations 410 for the blast design the blast design system receives a set of data inputs (e.g., blast specific data 402, blast limitation data 404, and location data 406). In some embodiments, these inputs fall in different categories: geological properties, blast area properties, drill properties, available product and blast restrictions, and seismograph properties.

For example, in the illustrated embodiment, the blast design system receives blast specific data 402, blast limitation data 404, and location data 406. The blast specific data 402 may include a face height for the blast, a desired pattern type (e.g., square, rectangular, staggered), and whether the holes are wet.

The blast limitation data 404 can include one or more limitations that the user sets. For example, the user may be limited on the weight of explosive, the weight of materials, the volume of material, or the number of holes. In some embodiments, the blast limitation data 404 may include a distance from the blastholes to the face of the mine.

In the illustrated embodiment, the location data 406 includes available drill diameters, geology data, available explosive product, seismograph data, and other parameters collected from a measure while drilling (drill data).

The geology data may represent geological properties, geologic characteristics, and geologic factors of a site. Non-limiting examples of geological properties include mineralogy (elemental and/or mineral), lithologic structure (primary, secondary, and/or texture), porosity, hardness, attenuation, Young's Modulus, Shear Modulus, Bulk Modulus, Poisson Ratio, P wave velocity, S wave velocity, rock density, rock type, rock strength, rock conditions, rock description, joint condition, joint angle, joint orientation, standard deviation of joint spacing, cohesion, vertical joint spacing, horizontal joint spacing, unconfined compressive strength (UCS), sonic velocity, standard deviation of drilling, shock velocity, fracture toughness of rock, reflectivity of rock, tensile strength of rock, internal friction angle, Hugoniot data (e.g., Up min, Up max, Us min, Us max), and ground stresses ($\sigma 1$, $\sigma 2$, $\sigma 3$, stress orientation, dip, direction, and roll). "Texture" refers to the size, shape, and arrangement of the interlocking mineral crystals which form a rock or other material. The geology data may be used to determine further geologic characteristics, such as friability and fragmentability.

The geological properties may be determined directly or indirectly from sources such as seismic data, drilling data, drill cuttings, core samples, or combinations thereof. For example, drill cuttings and/or core samples may be analyzed using x-ray or gamma-ray fluorescence, scanning electron microscopy, and other spectroscopy and/or microscopy techniques.

The seismograph data may include a vibration requirement at a specific distance. In some embodiments, geological properties may be determined by seismograph data. For example, processing circuitry may compare seismic vibration at a source (e.g., the drill or test charge) and seismic vibrations at the one or more geophones. Based at least on the delay, frequency, and amplitude of the seismic vibrations, the processor circuitry may determine geological properties (e.g., fragmentation, composite densities, compositions, rock impedances, hardness value, Young's modulus, shear strain, or other such properties).

The drill data may include information on a continuous or an incremental basis, such as on a per foot basis. The drilling data may include information such as drill bit size, drill bit rotary speed, drill bit torque, penetration rate, bit vibration, pull down pressure, bailing air pressure, hole location, hole number, and hole length or depth. The drilling data may correlate to the geological properties along the length of the blasthole. Thus, drilling data can be used to generate hardness values along the length of the blasthole (i.e., the hardness profile).

In some embodiments, the blast design system may receive a subset of the set of data inputs or additional information. For example, not every calculation will use a vibration check. Therefore the attenuation and seismograph data can be an optional input.

In some embodiments, the blast specific data 402 may include a desired fragmentation. For example, the blast specific data 402 may include a desired average fragmentation size.

The blast design system uses the set of data inputs for the calculations 410 for the blast design 408. The calculations 410 include determining a pattern footage 412, determining a burden and a spacing 414, determining structure of borehole 416, and determining a number of holes 432 needed to satisfy limitations. The calculations 410 also include blast validity checks to determine if the blast design meets certain criteria. For example, in the illustrated embodiment, the validity checks include an energy check 420, a burden stiffness check 422, and a vibration check 424.

In some embodiments, the blast design system may determine a distance from the blastholes to the face based on the desired fragmentation, the desired volume of rock, or other user defined or geographic parameters.

When determine the pattern footage 412, the blast design system defines an area around holes in the blast design 408. The pattern footage value is the product of burden and spacing, in other words it represents the recommended area around every hole. The pattern footage takes into account several factors (e.g., Geology, Product, and Hole Diameter) and the result affects all other calculations in the process. The pattern footage represents an area capable of being properly fragmented by the available explosive product in a blasthole located in the bench. Determining the pattern footage may be based on a relationship between the face height, the specific energy of the available explosive product, and the geological properties of the bench.

The pattern footage can be a product of a first factor based on the geological properties and the blasthole parameters and a second factor based on a specific energy of the available product. For example, the specific energy may be a correlation between ANFO (e.g., 94% ammonium nitrate prill and 6% fuel oil) and the available explosive product (e.g., relative bulk strength (RBS) of the available explosive product), and a third factor based on a diameter of the available explosive product.

In some embodiments, the blast design system calculates the first factor by calculating a result of multiplying a first geological factor by the natural log of a dividend of a blasthole height or face height divided by the diameter of the available product (or the blasthole diameter if the product is a bulk explosive). The result can be reduced by a second geological factor. If one or more decks are present, the distance between the one or more decks and/or the top or bottom (toe) of the blasthole can be used as the face height to calculate the pattern footage for portions of the blasthole. Thus, the first factor may be:

$$\text{First factor} = \left[ A * \ln\left(\frac{\text{Height}}{\text{Diameter}}\right) - B \right] \quad \text{Equation 1}$$

The geological factors or geological constants (i.e., A and B) may comprise empirical variables that correlate geological properties with geometric properties of the blasthole. Equation 1 uses a ratio of the face height and the diameter of the available explosive product as a variable in an equation with geological constants empirically fit to prior blast data from previous blasts that resulted in proper fragmentation of the particular bench material of the previous blasts to determine a raw pattern footage. The prior blast data may also be used to determine what type of explosive product to use or amount of explosive product to use. The prior blast data includes actual explosive loaded data from site equipment used to load explosives in boreholes in the previous blasts. The site equipment may include equipment for automatic loading of blastholes. The prior blast data may include pattern footage, burden, spacing, actual mass of explosive product, and/or volume of explosive product loaded into blastholes. In this example, the equation comprises a first order polynomial. For example, Table 1 includes example geological factors. The geological factors may have a linear relationship. In some embodiments the geological factors may be the relationship between the natural log of the height and depth of the blasthole and the geological properties.

TABLE 1

| | Geological Input | | | | | |
|---|---|---|---|---|---|---|
| | Favorable | | Average | | Difficult | |
| Rock Class | A | B | A | B | A | B |
| Massive (3) | 424.66 | −38.39 | 411.21 | 36.63 | 397.77 | 111.66 |
| Laminated (1, 2) | 552.13 | −49.388 | 534.51 | 47.99 | 516.89 | 145.37 |

In some embodiments, the blast design system calculates the second factor by adding a correction factor to the specific energy. The second factor may also be limited to under a certain amount. For example, the second factor may be:

$$\text{Second factor} = \min\left(\frac{RBSproduct}{157.7} + 0.366, 1.2\right) \quad \text{Equation 2}$$

RBS is the specific energy used for this example calculation. The RBS can be scaled by 157.7 to scale RBS value. In Equation 2, the second factor can be limited to 1.2 or less.

In some embodiments, the blast design system calculates the third factor by dividing the diameter by a measuring unit factor to take the hole diameter measurement to a desired spacing unit. The resulting dividend can be squared. For example, the third factor may be:

$$\text{Third factor} = \left(\frac{\text{Diameter}}{12}\right)^2 \quad \text{Equation 3}$$

Thus, the pattern footage may be:

$$\text{Pattern Footage} = \left[A * \ln\left(\frac{\text{Height}}{\text{Diameter}}\right) - B\right] * \min\left(\frac{RBS_{product}}{157.7} + 0.366, 1.2\right) * \left(\frac{\text{Diameter}}{12}\right)^2 \quad \text{Equation 4}$$

The previously provided equations and Table 1 were an imperial version. A similar equation may be used for metric unit system as shown below. Equation 5 and Table 2 may be used if metric unit system can be used.

$$\text{Pattern Footage} = \left[A * \ln\left(\frac{\text{Height}}{\text{Diameter}}\right) - B\right] * \min\left(\frac{RBS_{product}}{157.7} + 0.366, 1.2\right) * \left(\frac{\text{Diameter}}{1000}\right)^2 \quad \text{Equation 5}$$

TABLE 2

| | Geological Input | | | | | |
|---|---|---|---|---|---|---|
| | Favorable | | Average | | Difficult | |
| Rock Class | A | B | A | B | A | B |
| Massive (3) | 462.28 | −2076.1 | 430.02 | −1861.9 | 397.77 | −1647.6 |
| Laminated (1, 2) | 601.18 | −2699.1 | 559.04 | −2420.0 | 516.89 | −2140.8 |

The pattern footage can be used to determine the burden and spacing 414, and perform the energy check 420. The burden and spacing represent the length and the width of the pattern footage and can vary based on a chosen blast shape or pattern and the geology. For example, the burden may be determined by multiplying the square root of the pattern footage by a constant derived from a rock class from the geological properties of a blast site and a shape of the desired blast pattern type. Equation 6 and Table 3 provide an example equation and constant that may be used to determine burden.

$$\text{Burden} = \sqrt{\text{PatternFootage}} * C \quad \text{Equation 6}$$

In Equation 6 C is the constant derived from a rock class from the geological properties of a blast site, and a shape of the desired blast pattern type. Table 3 includes example values for C for a square and a rectangle.

TABLE 3

| Pattern Type | Square/Rectangle | Staggered |
|---|---|---|
| Rock Class | | |
| Massive (3) | 1 | 0.85 |
| Laminated (1, 2) | 1 | 0.93 |

The blast design system can calculate spacing by dividing the pattern footage by the burden as shown below.

$$\text{Spacing} = \frac{\text{Pattern Footage}}{\text{Burden}} \quad \text{Equation 7}$$

In some embodiments, the burden and spacing may be rounded to the closest 0.5 ft (0.1 m for metric) increment.

In some embodiments, the blast design system performs a constraint check after determining the spacing and burden. For example, for imperial units for a square or rectangular pattern, the blast design system may determine if the distance between holes is greater than 1.5 times the hole diameter used. In some embodiments, if the spacing is less than 1.5 times the check fails and the current blast design is not valid and should not proceed with further calculations. For a staggered pattern the check may be $\sqrt{\text{burden}^2 + \text{spacing}^2} \geq 1.5 \times$ diameter of blasthole. If metric units are used 1.5 may be replaced with 0.018.

The blast design system may perform the energy check 420 to determine if a resulting blast will have energy within a target range. To determine the mass of explosive in the column, the blast design system may use Equation 8.

$$\text{Mass of Explosive In Column} = \left(\frac{\text{Product Diameter}}{2}\right)^2 / 1000 * \pi * \text{Hole Depth} * \text{Explosive Density}_{product} \quad \text{Equation 8}$$

The mass energy of an explosive may then be determined as shown in Equation 9.

$$\text{Mass Energy} = \frac{(\text{Mass Of Explosive In Column} * E \text{ per Mass\_product})}{B * S * \text{Face } Ht * \text{rock density}} \quad \text{Equation 9}$$

The blast design system may check the mass energy of the blast against a minimum energy mass threshold and a maximum energy mass threshold as shown in Equation 10.

$$\text{EnergyMass}_{lower} < \text{MassEnergy} < \text{EnergyMass}_{upper} \quad \text{Equation 10}$$

In some embodiments, the blast design system may also check that the mass energy of the blast is within the parameters described in Equation 11.

$$\text{Max}\left(\text{Energy Mass}_{lower}, \frac{\text{Energy Volume}_{lower}}{\text{rock density}}\right) < \quad \text{Equation 11}$$
$$\text{Mass Energy} <$$
$$\text{Min}\left(\text{Energy Mass}_{upper}, \frac{\text{Energy Volume}_{upper}}{\text{rock density}}\right)$$

If the mass energy of the blast is not within either target range, the current blast design is not valid and the blast design system does not need to proceed with the remaining process.

The burden and spacing are used for the burden stiffness check 422 and to calculate the borehole details 416. The borehole details 416 describe the structure of a single borehole. To find a subdrill depth for the borehole the blast design system may multiply the burden by 0.3. Top stemming may be determined by multiplying the burden by 0.7. The factor of 0.7 can be changed for decked holes. The powder column may be determined by subtracting the top stemming from the depth of the blasthole.

The blast design system can also use the burden and spacing to perform the burden stiffness check 422. The burden stiffness can be the height of the hole divided by the burden as shown below $$\text{Burden Stiffness} = \frac{\text{Height}}{\text{Burden}} \quad \text{Equation 12}$$

The blast design system compares the burden stiffness to a burden stiffness minimum threshold. In one embodiment, the burden stiffness minimum threshold is 2. In some embodiments, if the burden stiffness is less than 2 the blast design system can stop proceeding with the calculations. In some embodiments, the blast design system can continue to generate a blast design, and throw a flag to the user if the burden stiffness check concludes that the burden stiffness falls below the burden stiffness minimum threshold.

The blast design system may complete the vibration check 424 to verify that the generated blast design passes the seismograph restrictions. The vibration check 424 can check what is the maximal amount of explosive that can be blasted in an 8 millisecond time frame. Using a maximum mass limit of explosives, the blast design system may check if the maximum mass limit has been surpassed. For example, the $$\text{max mass of explosive} = \text{Seismograph Distance}^2 \times \left(\frac{\text{Vibration Requirement}}{K}\right)^{\frac{2}{\alpha}},$$

where $\alpha$ is an alpha factor and the default is 1.6. K is a constant based on geological properties. Table 4 shows exemplary K values.

TABLE 4

| Geological Input | K Value |
| --- | --- |
| Favorable | 140 |
| Average | 160 |
| Difficult | 200 |

The blast design system may determine a number of holes needed to satisfy the blast limitation data 404. In some embodiments, the inputs of one of the four restrictions from the optional blast limitation data 404 may be calculated by the blast design system. Depending on which restriction the user enters, the calculation process performs a different calculation. The end result of each calculation should be the same. The end result is the needed number of holes which will satisfy the given limitation. Depending on which input is provided one of the following four equations will be used. The result of the following equations can be rounded to the nearest whole number to find the number of holes that meets the blast limitation data 404.

If the blast limitation data 404 is the total weight of the explosive, the blast design system can use Equation 13.

$$\text{Number of Holes} = \left\lceil \frac{\text{Total Weight of } Exp.}{\text{Weight of } Exp. \text{ in Borehole}} \right\rceil \quad \text{Equation 13}$$

If the blast limitation data 404 is the total volume of rock, the blast design system can use Equation 14.

$$\text{Volume of Rock Blasted from Borehole} = \text{Burden} * \text{Spacing} * \text{Face}Ht \quad \text{Equation 14}$$

If the blast limitation data 404 is the volume of rock to be blasted, the blast design system can use Equation 15.

$$\text{Number of Holes} = \left\lceil \frac{\text{Total Volume of Rock}}{\text{Volume of Rock Blasted from Borehole}} \right\rceil \quad \text{Equation 15}$$

If the blast limitation data 404 is the total weight of rock to be blasted, the blast design system can use Equation 16.

$$\text{Number of Holes} = \left\lceil \frac{\text{Total Weight of Rock}}{\text{Volume of Rock Blasted from Borehole} * \text{rock density}} \right\rceil \quad \text{Equation 16}$$

If the blast limitation data 404 is the number of holes then this blast limitation data is used.

The blast design system may perform a metric evaluation 430 to determine useful statistical data for the purpose of presenting them to the user. In one embodiment, the blast design system may determine the following factors during the metric evaluation 430.

$$\text{Powder factor} = \frac{\text{Total weight of explosive}}{\text{Total Volume of rock}} \quad \text{Equation 17}$$

Total Drill Length =

Number of Holes * (Face Height + subdrill) $\quad$ Equation 18

The blast design system may output the blast design 408. The blast plan comprises the burden and the spacing, borehole details, predicted vibration powder factor, number of holes, pattern details, drill length, volume of material to be blasted, weight of explosive, and/or weight of material to be blasted.

In some embodiments, determining the pattern footage comprises calculating a geometric relationship of the face height to the diameter of the available explosive product specific to the geological properties of the bench to determine a raw pattern footage. In some embodiments, the blast design system modulates the raw pattern footage based on differences between the specific energy of the available explosive product and the explosive product used in the previous blasts from which the prior blast data was used in generating the equation. In some embodiments, the blast design system modulates the raw pattern footage based on the volume of the available explosive product.

Figure 5:
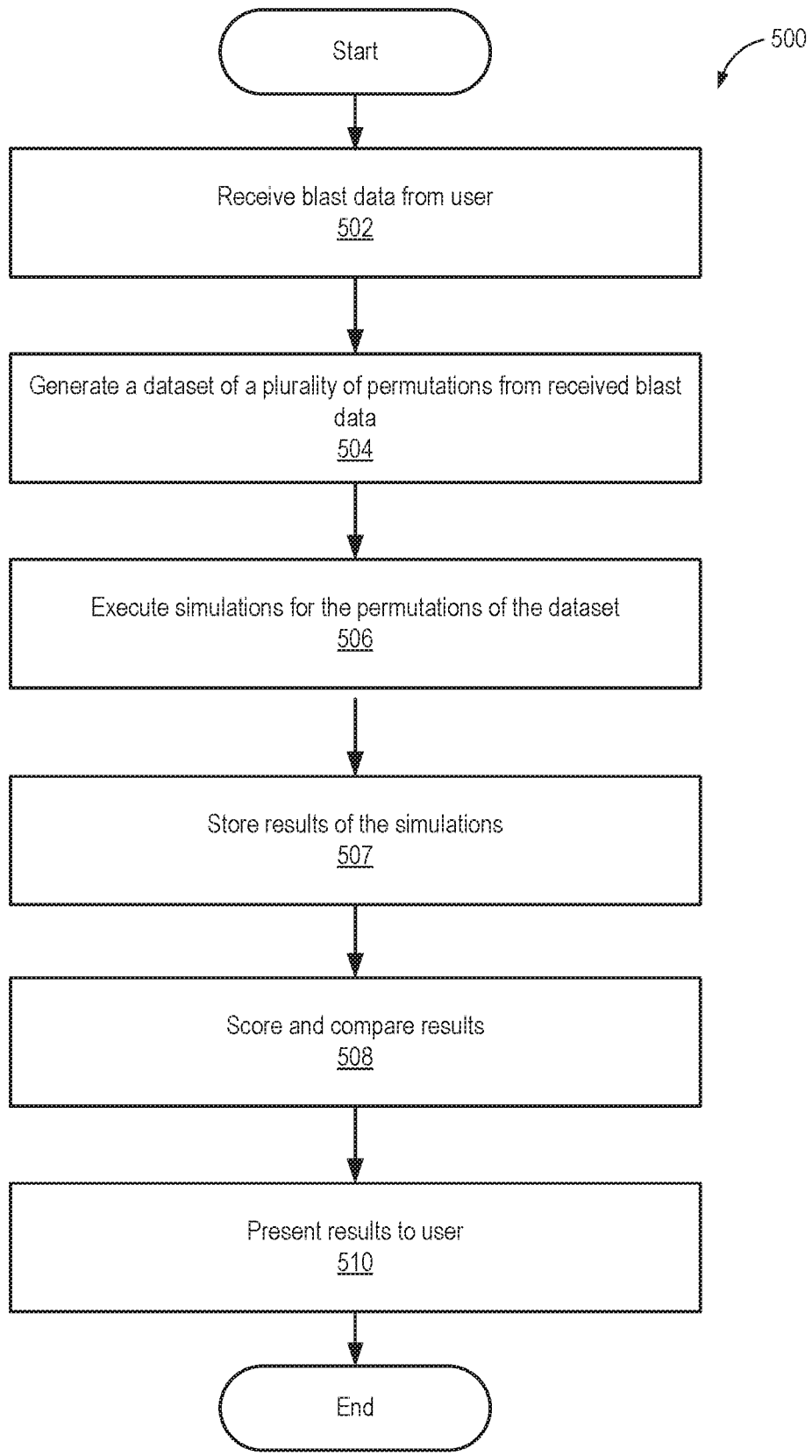
FIG. 5 illustrates a flow chart of a method for generating a blast design by executing multiple simulations for a plurality of possible permutations according to one embodiment.

In some embodiments, the blast design system may perform optimization of the blast design by generating a dataset comprising a plurality of permutations of the received blast data (see FIG. 5). The blast design system may simulate a blast for each of the plurality of permutations to determine a plurality of simulated results and base the blast plan on a top scoring simulated result. In some embodiments, the blast design system may perform post-blast analysis of images of the debris and adjust future blast plans based on size and location of the debris.

In some embodiments, the blast design system may vary an emulsion explosives density within the permutations for simulation to determine an optimum energy profile for each blasthole. For example, the blast design system may determine segments within the blasthole with different geological properties. The plurality of permutations may include different explosive densities and/or product for the blastholes and/or segments within the blastholes. In some embodiments, the plurality of permutations may include different densities of an emulsion explosive or ammonium nitrate and fuel oil (ANFO) within segments within the blasthole with different geological properties.

In some embodiments, the blast design system may output a fragmentation prediction. For example, based on historic blasts, the blast design system may predict what the fragmentation size will be and provide that prediction to a user.

FIGS. 5-13 illustrate various aspects of generating a blast design by executing multiple simulations for a plurality of possible permutations. Generating the blast design using multiple permutations as described in FIGS. 5-13 may be used by the blast design system 106 of FIGS. 1 and 3.

FIG. 5 illustrates a flow chart of a method 500 for generating a blast design by executing multiple simulations for a plurality of possible permutations according to one embodiment. The method executes the simulations of the permutations as problems that can be solved independently.

A blast design system executing this method 500 receives 502 blast data from a user. The blast data may include blast site dimensions, blast site geology, and available explosive types, and/or other data inputs (e.g., the blast specific data 402, blast limitation data 404, and location data 406 of FIG. 4). The blast design system generates 504 a dataset of a plurality of possible blast design permutations from the received blast data. The blast design system simulates 506 a blast for the plurality of permutations to determine a plurality of simulated results. The simulations may run in parallel on multiple machines, processors, cores, or threads to improve efficiency.

The simulation results are stored 507, and scored and compared 508. The design system may generate a blast plan based on a top scoring simulated result and present 510 the result to the user. The blast plan identifies location of blastholes to be drilled and type and quantity of explosive to be used. In some embodiments, the blast plans may be scored based on one or more of cost, number of decks, number of holes, burden stiffness ratio, and vibration score.

Figure 6:
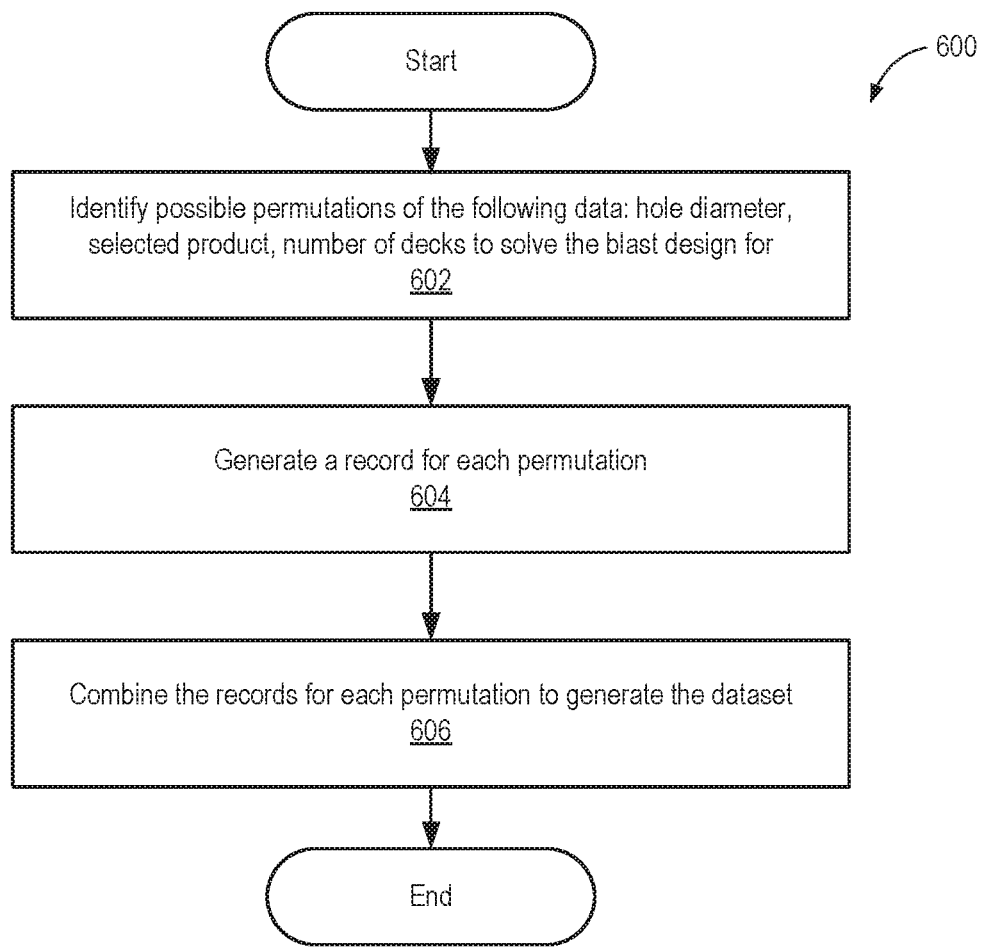
FIG. 6 illustrates an example of a method of generating a dataset of a plurality of permutations from blast data according to one embodiment.

FIG. 6 illustrates an example of a method 600 of generating a dataset of a plurality of permutations from blast data (e.g., see FIG. 5, generate 504 a dataset). A blast design system executing this method 600 identifies 602 possible permutations of the blast data. For example, the blast design system may use the available hole diameters, selected product, and the number of decks to identify the possible permutations. The blast design system may generate 604 a record for each permutation, and combine 606 the records for each permutation to generate the dataset.

For example, the blast data may comprise an indication that there is a max of three decks, that there are two hole diameters available (e.g., 89 mm and 102 mm), and that the selected product is Dynomix poured. In this example the blast design setup will be reduced to a set of all permutation of the blast data. For instance if there are no default products, the permutations would include:

[hole diameter=89 mm, product=dynomix poured, hole configuration=1]
[hole diameter=89 mm, product=dynomix poured, hole configuration=2]
[hole diameter=89 mm, product=dynomix poured, hole configuration=3]
[hole diameter=102 mm, product=dynomix poured, hole configuration=1]
[hole diameter=102 mm, product=dynomix poured, hole configuration=2]
[hole diameter=102 mm, product=dynomix poured, hole configuration=3]

The total number of permutations can be calculated with Equation 18. In this particular example there would be six possible permutations.

Number of tasks=(selected products+default products)*|hole diameters|*max number of decking $\quad$ Equation 18

In some embodiments, permutations may also include different densities of explosive products within segments of the blastholes. For example, the blastholes may have a hardness profile that varies, and the permutations may apply a certain density of explosive products at segments of a blasthole with similar hardness values, a second density of explosive products at segments of a blasthole with a different hardness value, a third density of explosive products at segments of a blasthole with a further different hardness value, and so on.

Figure 7:
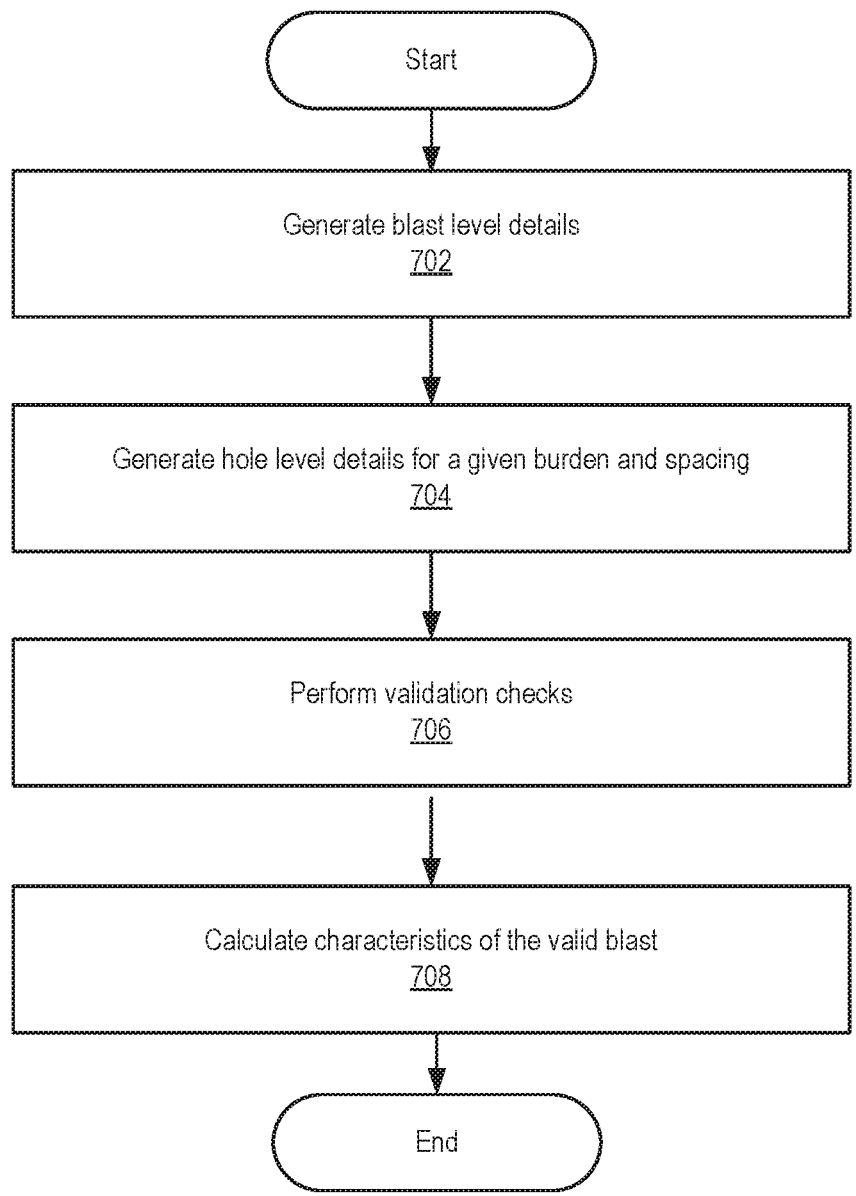
FIG. 7 illustrates an example of a method for simulating the permutations of the dataset according to one embodiment.

FIG. 7 illustrates an example of a method 700 for simulating the permutations of the dataset (e.g., see FIG. 5, execute 506 simulations). A blast design system executing this method 700 generates 702 blast level details. This includes pattern footage, burden, and spacing. In the illustrated embodiment, the blast design system also generates 704 hole level details for the burden and spacing. The blast design system may perform 706 validation checks to determine if the blast design will meet target criteria for a valid blast. The method may then calculate 708 characteristics of a valid blast. More detail for these steps is provided in the following figures.

Figure 8A:
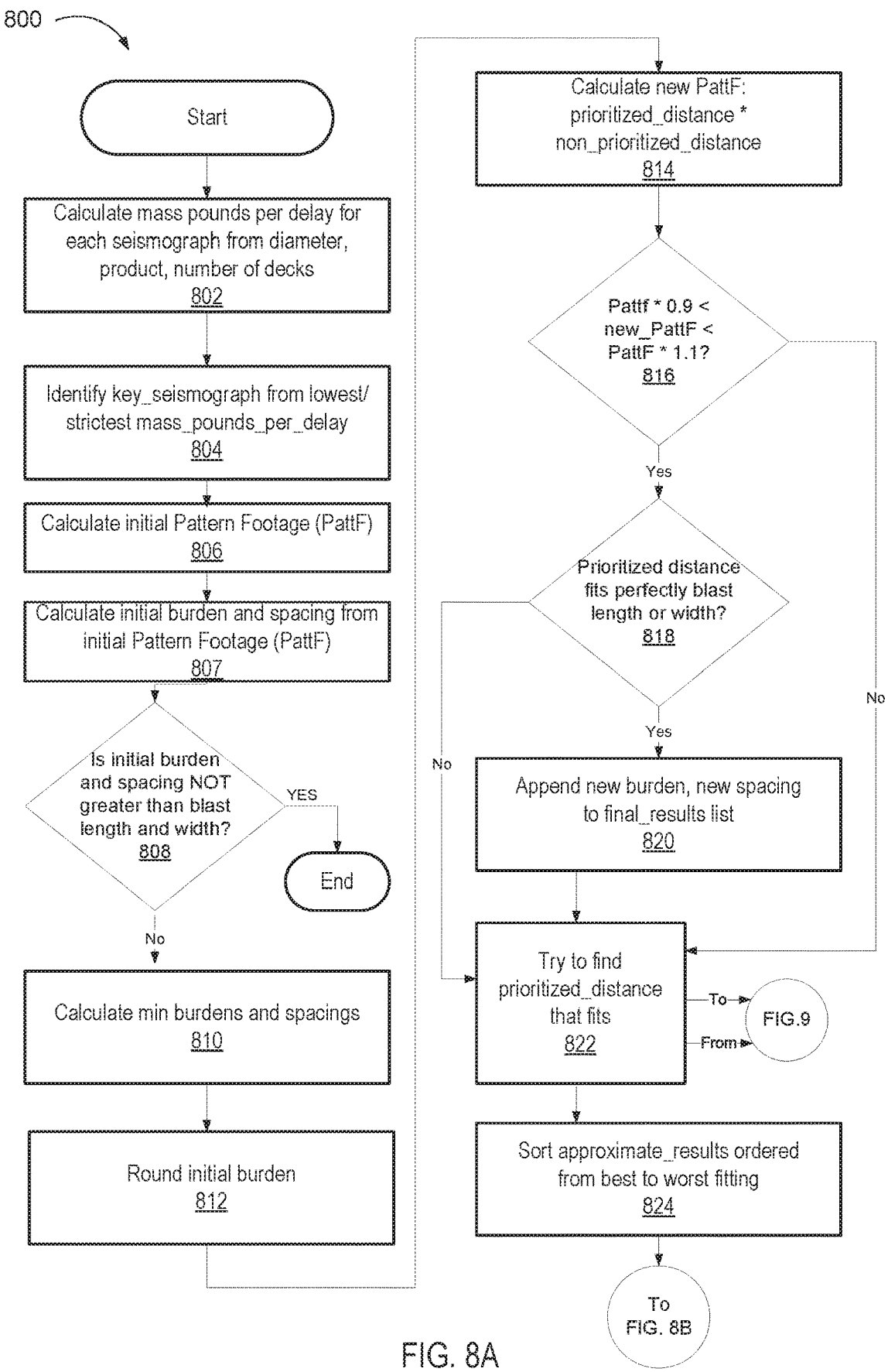
FIG. 8A illustrates a first part of a method for generating blast level details according to one embodiment.
Figure 8B:
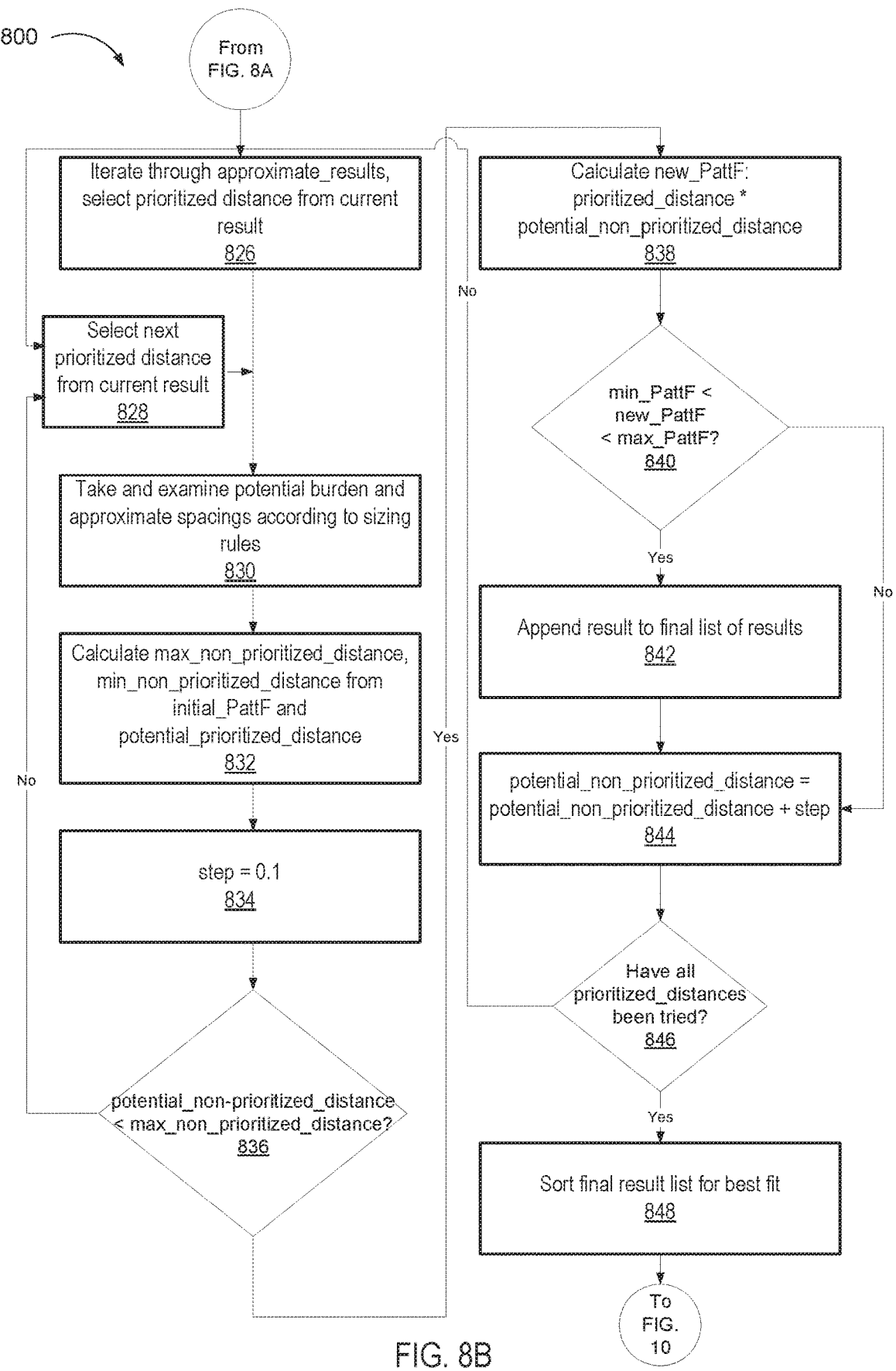
FIG. 8B illustrates a second part of a method for generating blast level details according to one embodiment.

FIGS. 8A and 8B illustrate a method 800 for generating blast level details (e.g., see FIG. 7, generate 702 blast level details). The method 800 generates potential blast design solutions from the given inputs. The blast design system may calculate 802 mass pounds per delay for each permutation and seismograph from diameter, product, number of decks, and identify 804 the permutations from lowest seismograph and strictest mass pounds per delay.

The blast design system calculates 806 initial Pattern Footage. This may be done using Equation 4 and Table 1 or Equation 5 and Table 2 as described with reference to FIG. 4. The blast design system calculates 807 initial burden and spacing from initial Pattern Footage. The initial burden may be calculated using Equation 6 and Table 3 and the spacing may be determined using Equation 7 as described with reference to FIG. 4.

The blast design system determines 808 if the initial burden and spacing is not greater than blast site length and width. If the initial burden and spacing are greater than the blast site length and width then there are no possible solutions and the method ends. If the initial burden and spacing are not greater than the blast site length and width then the method continues, and calculates 810 a minimum burden and spacing where the $$\frac{\text{initial spacing}}{1.4}$$

is less than the burden and the burden is less than the initial spacing.

The blast design system may round 812 the initial burden. For example, the blast design system may round the initial burden to 1 decimal point or by 0.5 if in feet.

The blast design system calculates 814 a new pattern footage. The new pattern footage=prioritized_distance*non_prioritized_distance. The prioritized distance may be burden or spacing depending on which one the user desires to fit better, the blast length or blast width. For example, if the prioritized distance is burden then the non-prioritized distance becomes spacing.

The blast design system checks 816 if the new pattern footage is within a target range, the range being: the pattern footage*0.9<new_PatternFootage<PattF*1.1. If the new pattern footage is not within the target range, the blast design system tries 822 to find a prioritized distance that fits as described in FIG. 9. If the new pattern footage is not within the target range, the blast design system checks 818 if the prioritized distance fits perfectly (e.g., blast length or width equals the prioritized distance).

Figure 9:
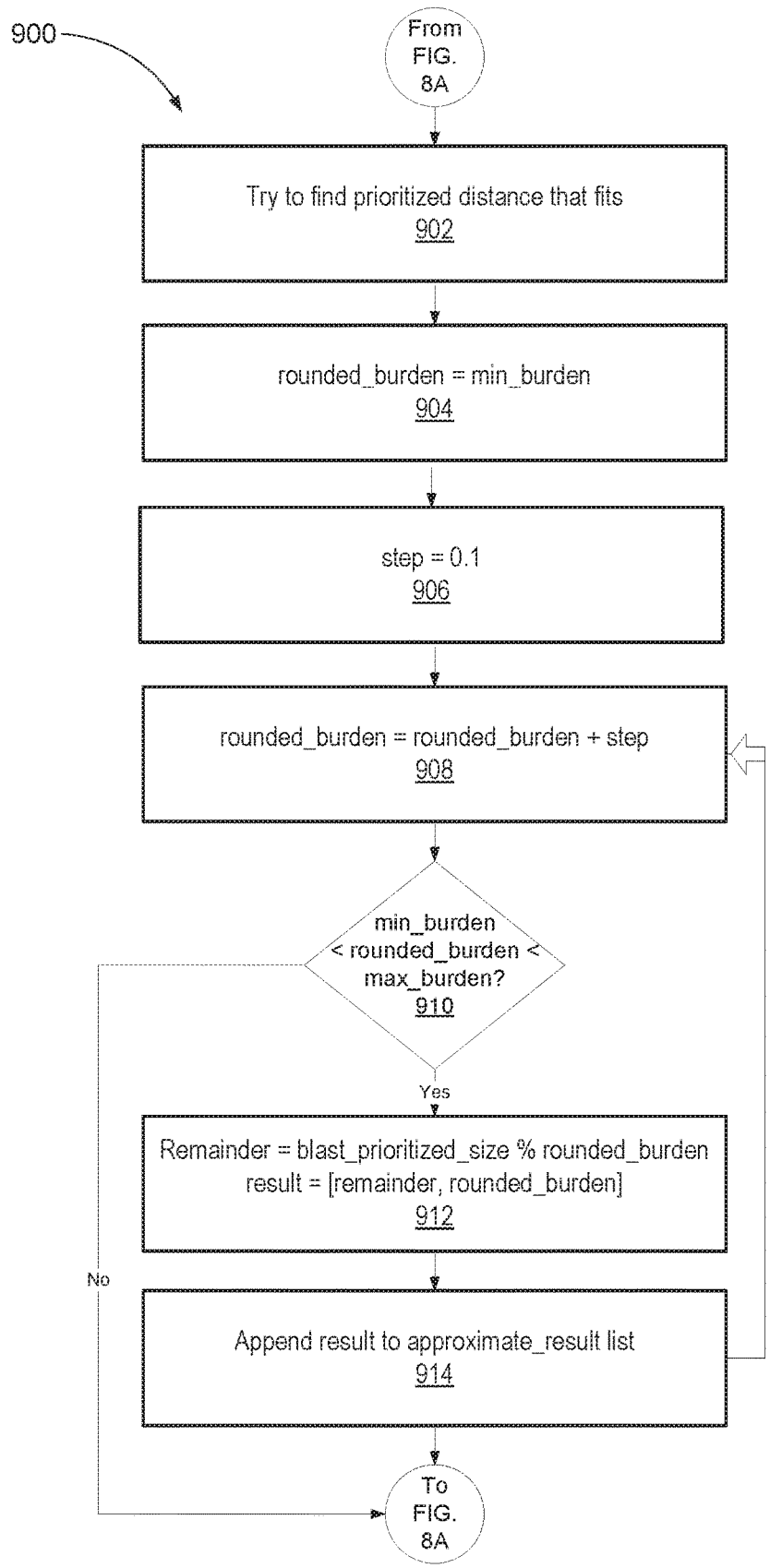
FIG. 9 illustrates a method for finding a prioritized distance that fits on the blast site according to one embodiment.

If the prioritized distance does not fit perfectly, the blast design system tries 822 to find a prioritized distance that fits as described in FIG. 9. If the prioritized distance does fit perfectly, the blast design system appends 820 the new burden and spacing to a final results list and then tries to find 822 other prioritized distances that fit. The blast design system sorts 824 an approximate results list ordered from best to worst fitting.

In FIG. 8B the blast design system iterates 826 through the approximate results list and selects a prioritized distance from current result. The blast design system takes a potential burden and spacing configuration from the approximate results list. The blast design system takes and examines 830 the potential burden and approximate spacing according to the sizing rules. The blast design system calculates 832 a maximum non-prioritized distance and a minimum non-prioritized distance from initial_Pattfootage and potential_prioritized_distance. The blast design system may calculate a maximum and a minimum non-prioritized distance based on Equations 19 and 20.

Spacing burden≤1.4*burden      Equation 19

Burden spacing≤1.4*distance      Equation 20

The blast design system steps 834 the non-prioritized distance by 0.1 (or 0.5 if feet are used). After the step, the blast design system checks 836 if the potential_non_prioritized_distance<max_non_prioritized_distance. If the potential non-prioritized distance is not less than the target threshold the blast design system selects 828 the next prioritized distance from current result. If the potential non-prioritized distance is less than the target threshold the blast design system calculates 838 a new Pattern Footage that equals: prioritized_distance*potential_non_prioritized_distance.

The blast design system checks 840 to see if the new pattern footage is within a target range. For example, the target range may be min_PattF<new_PattF<max_PattF. If the new pattern footage is within the target range, the new pattern footage result is appended 842 to the final list of results. If the new pattern footage is not in the target range, the blast design system adds 844 a step to the potential non-prioritized distance.

The blast design system checks 846 to see if all the prioritized distances have been tried. If all have not been tried, the blast design system selects 828 a next prioritized distance from current results. If all prioritized distances have been tried, the blast design system sorts 848 the final result list for best fit (e.g., smallest remainder first), and the blast design performs a method to generate hole level detail as described in FIG. 10.

FIG. 9 is a method 900 that the blast design system may use to try 902 to find a prioritized distance that fits on the blast site. In this method the blast design system tries to find optimal fitting for prioritized distance (e.g., burden or spacing). Optimal fitting means that the overflow or underflow is minimal (i.e., that the remainder approaches or is equal to zero). For example, for a blast site with a width of 50 m, if the burden is 5 meters there is no remainder since 10 holes at 5 meters apart=50 m. As another example, the burden of 4.9 meters produces a remainder of 1 meter underflow for 10 holes, or 3.0 m overflow for 11 holes.

The blast design system may round 904 the minimum burden and generate 906 a step (e.g., 0.1 for meters, 0.5 for feet). The rounded burden is adjusted 908 by adding the step to the burden. The blast design system checks 910 if the rounded burden is within a target range, specifically, greater that the minimum burden and less than the maximum burden. If the rounded burden is not within the range, the blast design system returns to FIG. 8A to try to find a prioritized distance that fits. If the rounded burden is within the range, the blast design system determines 912 the remainder of a length of the site plan using the burden. For example, for a blast width of 50 m, and a burden of 5 m there is no remainder since 10 holes*5 m=50 m. In another example, where the burden is 4.9 m and the blast width remains at 50 m, there is a remainder of 1 m underflow for 10 holes or 3.9 m overflow for 11 holes. The system appends 914 the remainder and the burden to an approximate results list.

Figure 10:
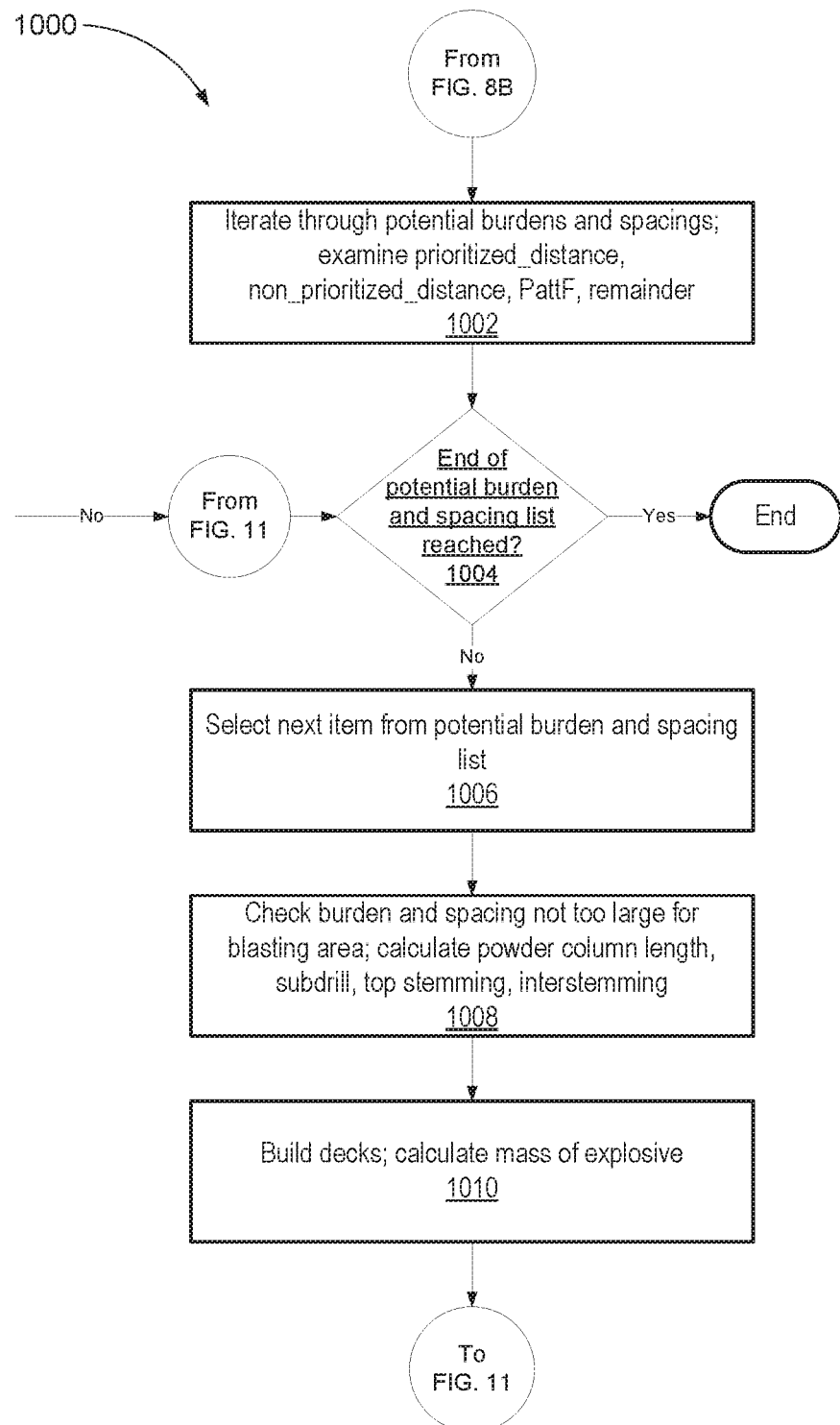
FIG. 10 illustrates a method for generating hole level details for a given burden and space according to one embodiment.

FIG. 10 illustrates a method 1000 for generating hole level details for a given burden and space (e.g., decking configuration, subdrill, top stemming, interstemming, and powder column length). The powder column length is the length of the portion of the blasthole filled with explosive. A blast design system using the method 1000 iterates 1002 through potential burdens and spacings and examines prioritized distances, non-prioritized distance, pattern footage, and remainder. The blast design system determines 1004 if all the potential burdens and spacings have been used. The blast design system selects 1006 the next item from the potential burden and spacing list. The system checks 1008 that burden and spacing are not too large for the blasting area and calculates powder column length, subdrill and top stemming and interstemming.

The blast design system may build decks 1010 and calculate mass of explosive. The blast design system may build decks 1010 based on the following criteria. Top and interdecks will have the same powder columns and explosive masses. Interdeck and bottom deck may have the same height (bottom deck height doesn't include subdrill). The bottom deck may have different mass of explosive because of the subdrill. The top deck will have different height because of the top stemming.

Figure 11:
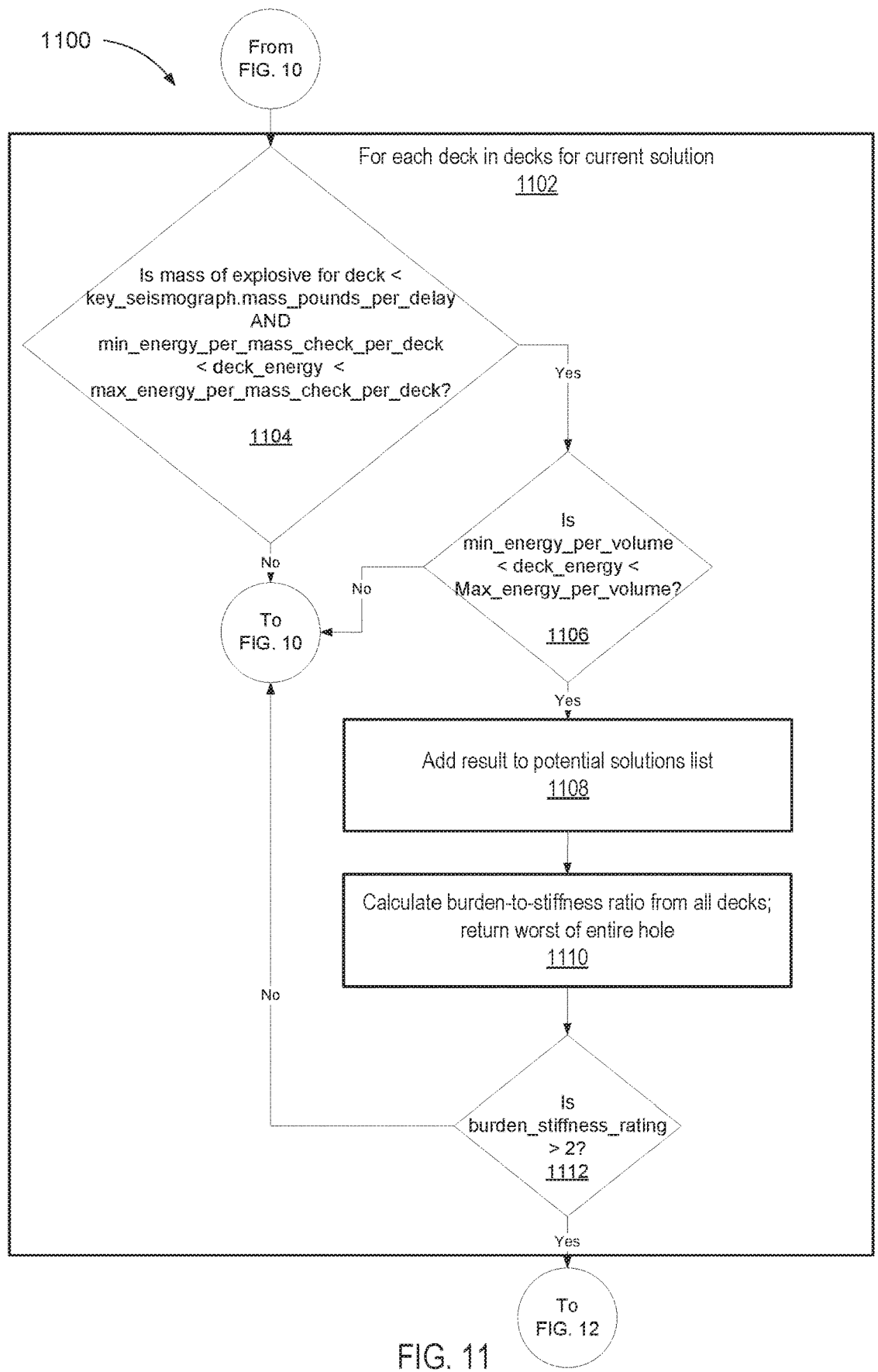
FIG. 11 illustrates a method for testing the validity of the planned blast design according to one embodiment.

FIG. 11 illustrates a method 1100 for testing the validity of the planned blast design. A blast design system using the method 1100 may perform a series of validity checks. For example, the blast design system may perform an energy and mass check, an energy per volume check, and a burden-to-stiffness check.

For the energy and mass check, the blast design system checks 1104 to see if the mass of explosive for the deck is less than key_seismograph.mass_pounds_per_delay AND if the min_energy_per_mass_check_per_deck is less than deck_energy and deck energy is less than the max_energy_per_mass_check_per_deck. The deck energy calculation can be:

$$\text{deck energy} = \frac{\text{mass of explosive} \times \text{energy per mass}}{\text{burden} \times \text{spacing} \times \text{deck height} \times \text{rock density}} \quad \text{Equation 21}$$

The energy per volume check may be used to check 1106 if the min_energy_per_volume is less than the deck_energy which in turn is less than the Max_energy_per_volume.

If the energy per volume is within the blast design then the solution is added 1108 to the potential solutions list. The blast design system calculates 1110 burden-to-stiffness ratio from all decks and return the result with the worst burden to stiffness ratio of the hole. The burden-to-stiffness check may be used to determine 1112 if burden_stiffness_rating>2.

Figure 12:
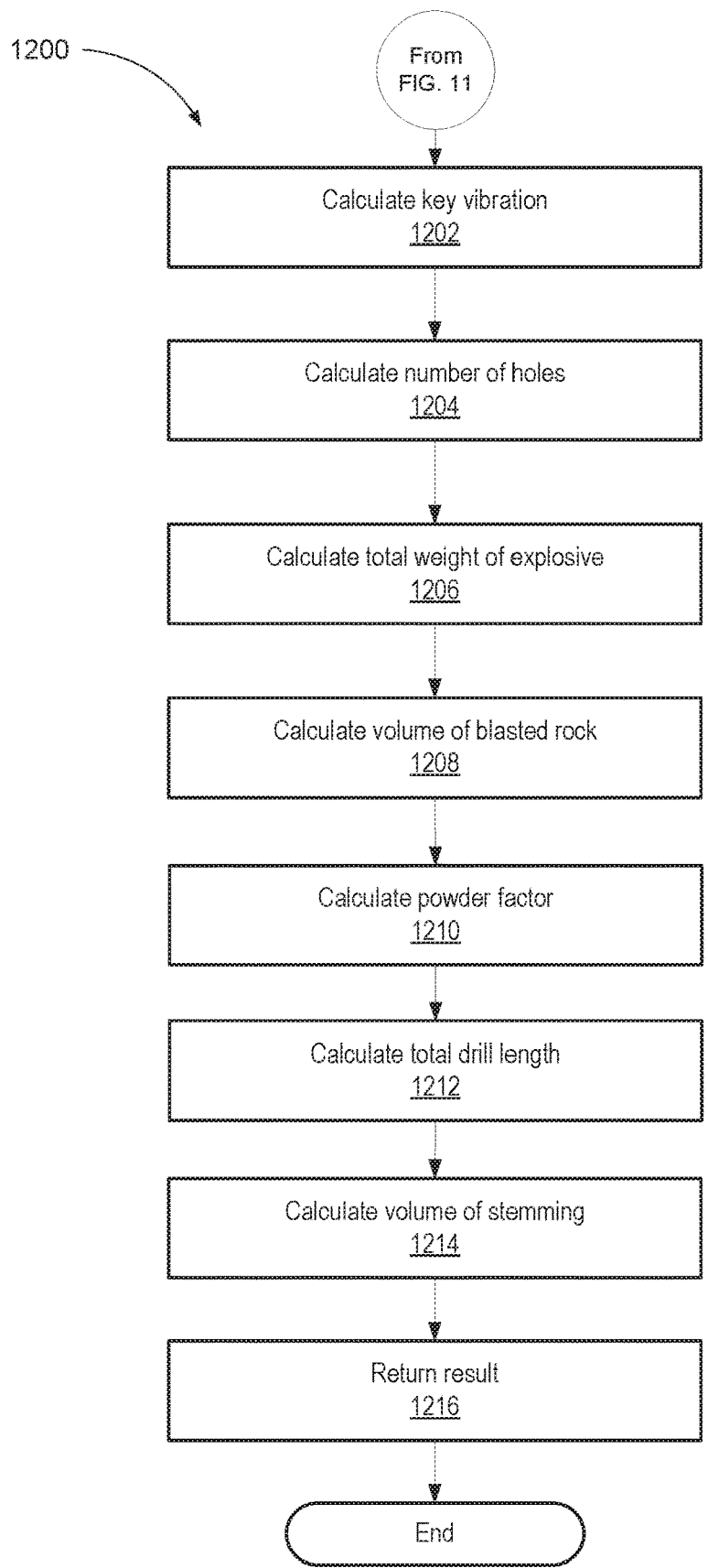
FIG. 12 illustrates a method for calculating specific characteristics of a valid design according to one embodiment.

FIG. 12 illustrates a method 1200 for calculating specific characteristics of a valid design. The method 1200 tests the validity of the planned blast design. A blast design system calculates 1202 a key vibration. In some embodiments $$\text{vibration} = \text{confinement} \ast\ast \text{deck energ} \ast \left( \frac{\sqrt{\text{mass of explosive}}}{\text{seismograph distance}} \right)^a,$$

where "a" may be always positive (e.g., a=1.6). The blast design system may calculate 1204 the number of holes, calculate 1206 the total weight of the explosive, calculate the total weight of material, calculate volume of material, calculate 1208 volume of blasted rock, calculate 1210 powder factor, calculate 1212 total drill length, calculate 1214 volume of stemming, and return 1216 results.

Figure 13:
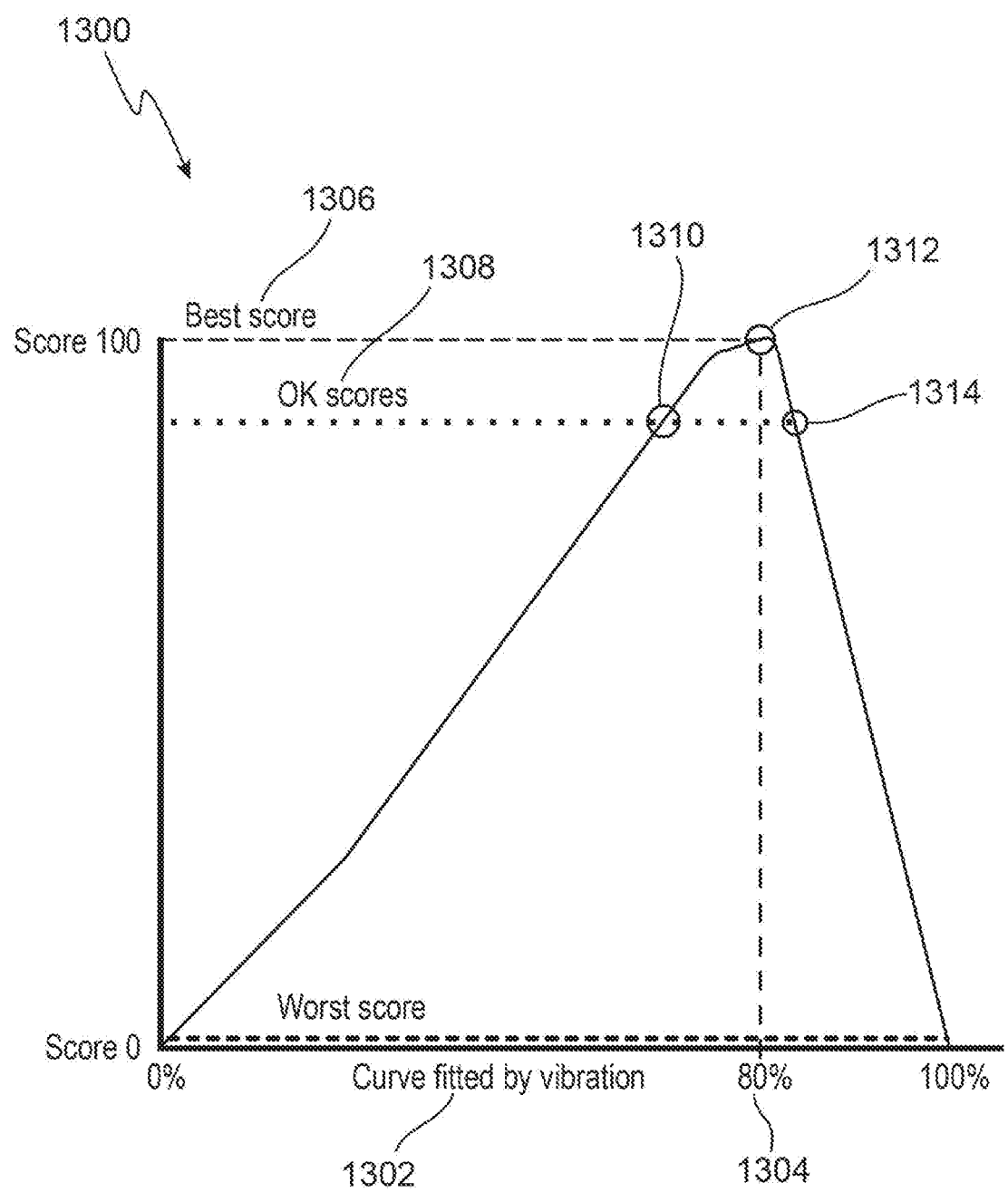
FIG. 13 illustrates a graph of exemplary blast plan results that have been scored based on vibration.

FIG. 13 illustrates a graph 1300 of blast plan results that have been scored based on vibration, with a curve fitted by vibration 1302. There are best scores 1306, 1312 and OK scores 1308, 1310, and 1314. In some embodiments, a top score is not chosen but a score at the point of 80% 1304 of the highest vibration is chosen. To achieve that the blast design system fits vibration results according to a polynomial similar to the graph 1300. Then once the results are fit according to the polynomial the scores are on the y axis. To score the blast plan results the blast design system may score based on one of the following methods: 1) least number of decks, 2) least number of holes, 3) burden stiffness ratio, or 4) vibration score. The first three methods sort the results by selected criteria.

Figure 14:
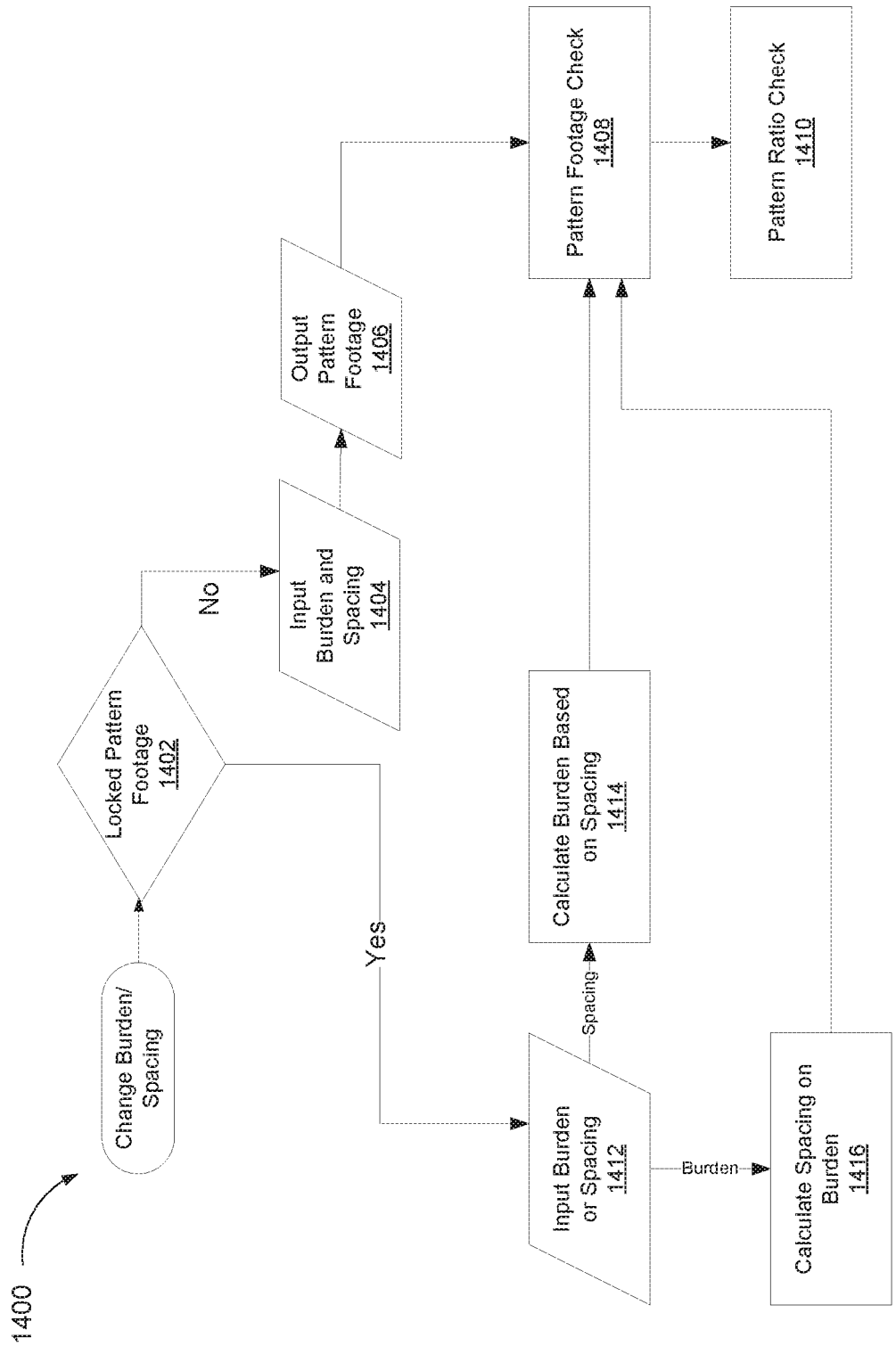
FIG. 14 illustrates a method for editing burden and spacing according to one embodiment.

FIG. 14 illustrates a method 1400 for editing burden and spacing. In some embodiments, a user may be able to use this method for editing the burden and spacing. The user may enter a desired burden and/or spacing.

For example, this method 1400 may be used to edit the burden and spacing determined using the methods outlined in FIGS. 8A-9. Since burden and spacing are calculated as a step of generating a blast design, adjusting these parameters may require partial execution of a method for generating a blast design (e.g., in FIG. 7 the method may generate 704 hole level details for a given burden and spacing, perform 706 validation checks (e.g., energy check, burden stiffness check, and vibration check), and calculate 708 characteristics of the valid blast (e.g., weight of explosive, weight of material, volume of material, number of holes, fragmentation size)).

A system using this method 1400 checks 1402 if the pattern footage is locked. A locked pattern footage indicates that the pattern footage is to remain the same after the burden or spacing is edited. If the pattern footage is locked the system receives 1412 input indicating either burden or spacing. If a spacing is entered, the system calculates 1414 burden based on the spacing. If a burden is entered, the system calculates 1416 spacing based on the burden. If the pattern footage is not locked the system receives 1404 input indicating burden and spacing, and outputs 1406 a pattern footage.

The system may further perform 1408 a pattern footage check. For example, the system may check that the pattern footage is larger or equal to the original pattern footage and less than or equal to 110% of the original pattern footage.

The system may further perform 1410 a pattern ratio check. For example, the system may check that spacing 1.5× hole diameter, and that spacing 1.5× burden.

The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A method for generating a blast plan, the method comprising:
   receiving geological properties of a blast site from one or more sources;
   identifying rock classifications that correlate with the geological properties of the blast site;
   generating a model of the blast site;
   determining a pattern of blastholes based on the rock classifications of the blast site; and
   determining an explosive for each of the blastholes based on the geological properties.

2. The method of claim 1, wherein the geological properties are received from at least one of seismic data, drilling data, drill cuttings, or core samples.

3. The method of claim 1, wherein the step of determining a pattern of blastholes comprises determining a burden and a spacing for the blastholes.

4. The method of claim 1, further comprising optimizing the pattern of the blastholes based on the geological properties.

5. The method of claim 4, wherein optimizing comprises generating a dataset comprising generating a plurality of permutations and simulating the plurality of permutations.

6. The method of claim 4, wherein optimizing comprises varying an emulsion explosive density within the permutations for simulation to determine an optimum energy profile for each blasthole.

7. The method of claim 1, further comprising overlaying the pattern of blastholes on the model of the blast site.

8. A method for generating a blast plan, the method comprising:
   receiving geological properties of a blast site from one or more sources;
   segmenting the blast site based on the geological properties;
   generating a model of the blast site;
   determining a pattern of blastholes based on a rock classification of the blast site; and
   determining an explosive for each of the blastholes based on the segmenting of the blast site.

9. The method of claim 8, wherein the geological properties are received from at least one of seismic data, drilling data, drill cuttings, or core samples.

10. The method of claim 8, wherein the step of determining a pattern of blastholes comprises determining a burden and a spacing for the blastholes.

11. The method of claim 8, further comprising optimizing the pattern of the blastholes based on the geological properties.

12. The method of claim 11, wherein optimizing comprises generating a dataset comprising generating a plurality of permutations and simulating the plurality of permutations.

13. The method of claim 11, wherein optimizing comprises varying an emulsion explosive density within the permutations for simulation to determine an optimum energy profile for each blasthole.

14. The method of claim 8, further comprising overlaying the pattern of blastholes on the model of the blast site.

15. The method of claim 1, wherein the step of determining a pattern of blastholes comprises determining borehole details for each blasthole.

16. The method of claim 1, wherein the step of determining a pattern of blastholes comprises determining a number of holes needed to satisfy a blast limitation.

17. The method of claim 1, wherein the step of determining an explosive for each of the blastholes comprises determining a powder factor of the explosive.

18. The method of claim 1, wherein the step of determining an explosive for each of the blastholes comprises determining a weight of the explosive.

19. The method of claim 8, wherein the step of determining a pattern of blastholes comprises at least one of determining borehole details for each blasthole or determining a number of holes needed to satisfy a blast limitation.

20. The method of claim 8, wherein the step of determining an explosive for each of the blastholes comprises at least one of determining a powder factor of the explosive or determining a weight of the explosive.

* * * * *